(12) United States Patent
Hunt

(10) Patent No.: US 8,843,726 B2
(45) Date of Patent: Sep. 23, 2014

(54) CACHE FOR STORING MULTIPLE FORMS OF INFORMATION AND A METHOD FOR CONTROLLING A CACHE STORING MULTIPLE FORMS OF INFORMATION

(75) Inventor: Douglas Hunt, Ft. Collins, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 563 days.

(21) Appl. No.: 13/031,518

(22) Filed: Feb. 21, 2011

(65) Prior Publication Data

US 2012/0215979 A1    Aug. 23, 2012

(51) Int. Cl.
*G06F 9/26* (2006.01)
*G06F 9/34* (2006.01)
*G06F 12/08* (2006.01)
*G06F 12/02* (2006.01)
*G06F 12/10* (2006.01)

(52) U.S. Cl.
CPC ........ *G06F 12/0802* (2013.01); *G06F 12/0284* (2013.01); *G06F 12/1027* (2013.01); *G06F 2212/2515* (2013.01)
USPC .................... 711/202; 711/118; 711/E12.014

(58) Field of Classification Search
CPC .................................................. G06F 12/0284
See application file for complete search history.

(56) References Cited

U.S. PATENT DOCUMENTS

2004/0162961 A1* 8/2004 Lyon .............................. 711/207
2009/0106524 A1* 4/2009 Chen et al. ..................... 711/206

* cited by examiner

*Primary Examiner* — Eric S Cardwell

(57) ABSTRACT

A cache is provided, including a data array having a plurality of entries configured to store a plurality of different types of data, and a tag array having a plurality of entries and configured to store a tag of the data stored at a corresponding entry in the data array and further configured to store an identification of the type of data stored in the corresponding entry in the data array.

14 Claims, 3 Drawing Sheets

CACHE FOR STORING MULTIPLE FORMS OF INFORMATION AND A METHOD FOR CONTROLLING A CACHE STORING MULTIPLE FORMS OF INFORMATION

TECHNICAL FIELD

The present invention generally relates to a memory system, and more particularly to a cache for storing multiple forms of information.

BACKGROUND

In the context of a computer architecture, a cache may be considered to be a memory system within a processor. While limited in space, a cache can retrieve data very quickly, often in as little as one processing cycle. Caches are used to store data which, for example, is accessed frequently or which is expected to be needed in the future. Current processors use several separate caches, each to store a different type of data. Each cache has a fixed number of entries within a processor and has a separate input/output interface to control the cache.

Accordingly, it is desirable to have a cache, and method for controlling a cache, which has more flexibility and which uses less space within a processor, relative to conventional designs. Other desirable features and characteristics will become apparent from the subsequent detailed description and the appended claims, taken in conjunction with the accompanying drawings and this background.

BRIEF SUMMARY OF EMBODIMENTS

A cache is provided, including a data array having a plurality of entries configured to store a plurality of different types of data and a tag array having a plurality of entries and configured to store a tag of the data stored at a corresponding entry in the data array and further configured to store an identification of the type of data stored in the corresponding entry in the data array.

A processor having a cache is provided. The processor includes a data array having a plurality of entries configured to store a plurality of different types of data, a tag array having a plurality of entries and configured to store a tag of the data stored at a corresponding entry in the data array and further configured to store an identification of the type of data stored in the corresponding entry in the data array, a first plurality of comparators, each comparator configured to receive data stored in at least one entry in the tag array, a content addressable memory having a plurality of entries configured to store identification bits corresponding to each entry in the data array, and a second plurality of comparators, each of the second plurality of comparator configured to receive data stored from an entry in the content addressable memory.

A method of controlling a cache by a processor is provided. The method includes determining, by the processor, an index, a tag and a data type, searching, in a tag array of the cache, at the determined index for the determined tag and data type, and returning, by the cache to the processor, a cache hit if an entry in the tag array matches both the determined tag and data type.

BRIEF DESCRIPTION OF THE DRAWINGS

The embodiments will hereinafter be described in conjunction with the following figures.

DETAILED DESCRIPTION OF EXEMPLARY EMBODIMENTS

The following detailed description is merely exemplary in nature and is not intended to limit the scope or the application and uses of the described subject matter. Furthermore, there is no intention to be bound by any theory presented in the preceding background or the following detailed description.

Figure 1:
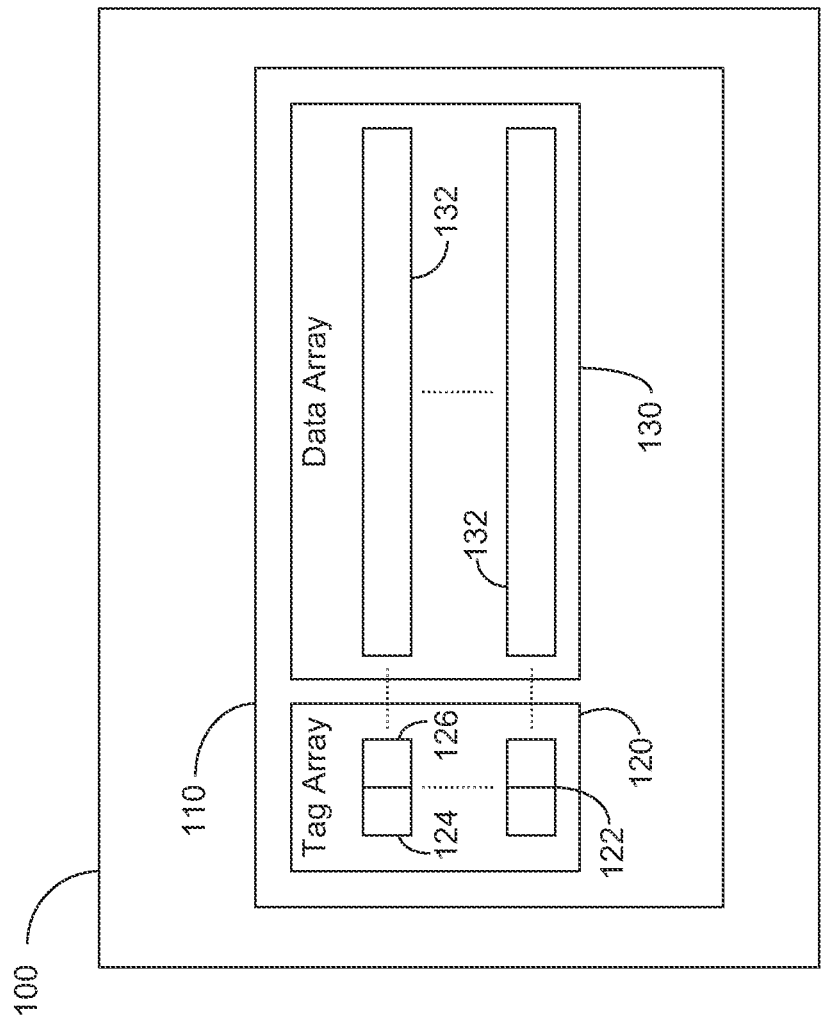
FIG. 1 illustrates an exemplary processor in accordance with an embodiment.

FIG. 1 illustrates an exemplary processor 100 having a cache 110 in accordance with one embodiment. The cache 110 includes a tag array 120 and a data array 130. The processor may include, for example, one or more computer processing units ("CPUs"), one or more graphical processing units ("GPUs"), or a combination of one or more CPUs and one or more GPUs. In another embodiment the cache 110 may be part of a network or server cache system.

The cache 110 is capable of simultaneously functioning as multiple different types of caches and storing multiple types of data. Caches are used in processors because retrieving data stored within the processor in a cache is significantly faster than retrieving data stored in memory external to the processor. Accordingly, data which is accessed frequently or which may be needed in the future can be stored locally in the cache so the processor can retrieve data faster. A cache memory (or simply "cache") in a processor is a data storage array which holds a subset of the data held in some larger storage array. The most common type of cache holds a subset of the data which is stored in the main memory (DRAM) of a processing system. The cache 110 can provide data to the processor 100 with lower latency or higher bandwidth or both lower latency and higher bandwidth than the larger storage array. The cache 110 can be designed to improve the performance of the computer by storing the data which is most likely to be used by the processor so that most of the time that the processor needs to read or write data to the large storage array, the read or write can be serviced by the smaller cache memory instead. Over time, cache control hardware determines when some data is no longer in demand by the processor 100 and can be moved out to the larger and slower main storage array and some other data can be moved into the cache which is being used more often.

In one embodiment, for example, the cache 110 may be an eight-way associative cache. In a conventional set-associative cache, the index is used to select a group of entries (the "set") from the cache, and the tags of each of these entries is compared with the tag of the entry being sought. If one of the entries has a tag which matches the "sought" tag, then the corresponding location in the data array contains the data being sought. In an eight-way set-associative cache, eight tags are compared at a time. The cache is organized in such a way that a given data item can only be stored at one particular index, based on some function of the address of the data item. Thus, if the address of the cache line sought after is a forty-two bit quantity, then a one thousand twenty four entry eight-way set-associative cache would derive a seven bit index from the forty-two bit address (typically the low-order seven bits of the forty-two bit address. Seven bits comes from the fact that, if we are organized as an eight-way set-associative cache, there will be 1024/8=128 different indexes. If the low order seven bits of the address are used as the index, then any data item stored at that index will have the same seven low order bits—so the tag will consist of the other thirty-five bits of the forty-two bit address.

In one embodiment, for example, the cache 110 may implement a translation lookaside buffer ("TLB"), a page directory cache ("PDC") and a Guest TLB cache. In other embodiments, the cache may store branch prediction information, branch target information, partially or fully decoded instructions, or any combination thereof. The cache 110, when implementing a TLB, a PDC and Guest TLB may be referred to as a page walk cache ("PWC"). While the description below discusses a cache 110 which implements a TLB, a PDC and a Guest TLB cache, one of ordinary skill in the art would recognize that other caches or data structures may also be implemented in cache 110.

The tag array 120 of the cache 110 has a plurality of tag entries 122, each of which stores a tag 124 and a data type 126 or identification for each data entry 132 in the data array 130. The tag 124 may vary depending upon the type of entry in the corresponding portion of the data array 130. In one embodiment, for example, the tag 124 may store a physical address where the data stored in the corresponding data entry 132 is also stored externally to the cache 110. In another embodiment, the tag 124 may store the virtual address of the data stored in the corresponding data entry 132. The data type 126 in a given tag entry 122 in the tag array indicates the type of data currently stored in the corresponding data entry 132.

The available data types 126 may include, but are not limited to, a TLB entry, a PDC entry and a Guest TLB entry. The cache may also store other data from system memory, such as operand data used by a CPU or graphics data used by a GPU.

A translation lookaside buffer ("TLB") is a form of cache used in most processors to quickly identify a location of data stored in an external memory (i.e., external to the processor 100) by associating a virtual address (used by software to refer to specific data items) with a physical address (corresponding to the actual location where the processor hardware has stored that data item). When a data entry 132 stored in the data array of a cache 130 is a TLB entry, the data array 130 stores the physical address of the data and the tag 124, stored in a respective entry in the tag array 120, is the search key. In a TLB, the search key is a virtual address. The physical address corresponds to a location in another memory where the actual data is stored. The other memory may be, for example, a random access memory ("RAM"), a local hard drive associated with the processor 100, a memory connected to the processor via a network connection or any other type of memory which can be accessed by the processor 100. If a requested index 124 is present in the tag array 120, the cache 110 yields a match and then retrieves a physical address stored in the data array 130 which can be used by the processor 100 to access memory. For purposes of this description, a "cache hit" refers to this type of matching condition. The processor 100 supplies an address (in the case of a TLB, this is a virtual address) for which it would like the cache 110 to return the corresponding physical address. This virtual address is broken into two parts: One part (the index) is used to select one entry from the tag array 120. (In the case of a multi-way set-associative cache/TLB it actually selects a "set" of tags—hence the name 'set-associative'). The tag 124 stored in the tag array 120 at that index is compared against the remainder of the virtual address (that is, the original virtual address leaving out the part used as an index). If the remaining part of the virtual address matches the tag 124 stored in that location of the tag array 120, the corresponding entry 132 from the data array 130 is returned; that is, the data stored at the same index in the data array as the tag which was accessed.

If the requested index 124 is not in the tag array 120, then a "miss" or a "cache miss" results, and the processor 100 proceeds to find the location of the requested data by looking up a page table in a process called a page walk. A page table is a data structure used by a virtual memory system in an operating system ("OS") to store a mapping between virtual addresses and physical addresses. Virtual addresses may be unique to a software process, whereas physical addresses are unique to each piece of hardware, for example, a CPU, RAM, hard drive, etc.

A page walk is a time-intensive process, as it involves reading the contents of multiple memory locations and using them to compute the physical address. After the physical address is determined by the page walk, the virtual address to physical address mapping is entered into the cache 110 as a TLB entry.

The steps taken in the page walk to determine the physical address may be stored as PDC entries in the cache 110 so that future page walks do not need to perform memory reads for those steps of the walk. As discussed above, in one embodiment TLB, PDC and Guest TLB entries are all stored in the cache 110.

A Page Directory Cache ("PDC") is used to store some of the steps required during a page walk to determine a virtual address to physical address mapping. Thus, when no TLB entry exists to provide the complete mapping from virtual to physical mapping, the time taken to perform the memory reads (or steps) along the page walk may be reduced if some of these steps are stored in a cache (called a Page Directory Cache). A PDC entry has a tag 124 formed from a sub-set of the virtual address and a data type 126 which indicates that the entry is a PDC entry and what level or levels of the page walk the entry represents. The data array entry 132 for a given PDC entry is the physical address of the next step of the page walk which must be performed to complete the translation of the supplied virtual address to the final physical address which is sought.

The PDC steps stored in the data array 130 can be used by the processor 100 to process subsequent page walks faster. For example, two separate page walks could share some number of steps. Accordingly, by storing the steps in the data array 130 of the cache 110, the page walks can be completed faster since the processor 100 does not have to recompute the same steps for related page walks.

As discussed above, another type of cache which can be incorporated into the cache 110 is a Guest TLB. Computers may run multiple versions of the same OS simultaneously, for example, if different applications are only supported by specific revisions of an OS. A single computer may also be running multiple different OS's simultaneously, for example one or more versions of Microsoft Windows®, Unix®, Linux®, one or more versions of the Apple OS®, etc. Multiple copies of the various operating systems may also be running simultaneously. The processor 100 may include a super supervisor, otherwise known as a hypervisor, to manage the multiple operating systems running on the processor 100.

Each of the operating systems running on the processor 100 may have their own specific TLB entries, which may be called Guest TLB entries. Guest TLB entries may be created via another layer in the virtual to physical address translation process. For example, the Guest OS may maintain page tables which translate the virtual addresses used by that Guest OS into Guest Physical addresses. The hypervisor may then maintain a second set of page tables which are used to translate the Guest Physical addresses into System physical addresses, which correspond to the addresses in system memory where the data actually resides. In such a system, a Guest TLB may be used to cache the translations from Guest Virtual addresses to Guest Physical addresses. The primary TLB may then be used to translate the Guest Physical addresses into System Physical addresses.

One advantage, for example, of using a single cache 110 for storing entries from multiple different types of entries is that only a single cache structure, rather than multiple separate structures, is needed. Having a single cache structure rather than multiple cache structures may, for example, reduce the amount of space needed for a given cache structure on the processor 100.

In one embodiment the processor 100 may dynamically assign a number of entries in the cache 110 for each data type stored in the data array 130. For example, if the processor 100 isn't running multiple operating systems then no Guest TLB entries would be needed. Thus, the processor 100 can assign more entries for TLB and PDC entries. Accordingly, one benefit of this embodiment, for example, is that the cache 110 can be used more efficiently since the processor 100 can dynamically assign entries based upon the needs of the processor. In another embodiment the cache 110 may assign a predetermined number of entries to each data type.

Another benefit of the cache 110, for example, is that less space may be used in the processor. As discussed above, prior processors used separate cache systems for each data type. In one embodiment, for example, the cache 110 may have fewer overall entries than prior cache systems. However, because the processor 100 can dynamically assign the entries, as discussed above, then entries can be used more efficiently and fewer entries overall may be needed. Furthermore, prior systems required separate, redundant input/output ("I/O") interfaces for each separate cache. Accordingly, another benefit of the embodiment is that only a single I/O interface to the cache 110 is needed, further reducing the amount of space needed for the cache 110.

Furthermore, while in one embodiment the cache 110 may have fewer entries overall when compared to prior processors, the cache 110 may have more entries than any one of the prior separate caches. Accordingly, because the processor 100 can dynamically assign entries based upon the needs of the system, the cache 110 may be capable of storing more of any one type of entry (TLB, PDC, Guest TLB, etc.) than prior processors.

In one embodiment the data type stored in the tag array 120 may be encoded. For example, if three types of data are stored in the cache, a two-bit encoding system could be used to identify the data type. For example, in one embodiment a TLB entry may be designated with the code "01," a PDC entry may be designated with the code "10," and a Guest TLB entry could be designated with the code "11." One of ordinary skill in the art would recognize that there are many possible encoding schemes that could be used.

Figure 2:
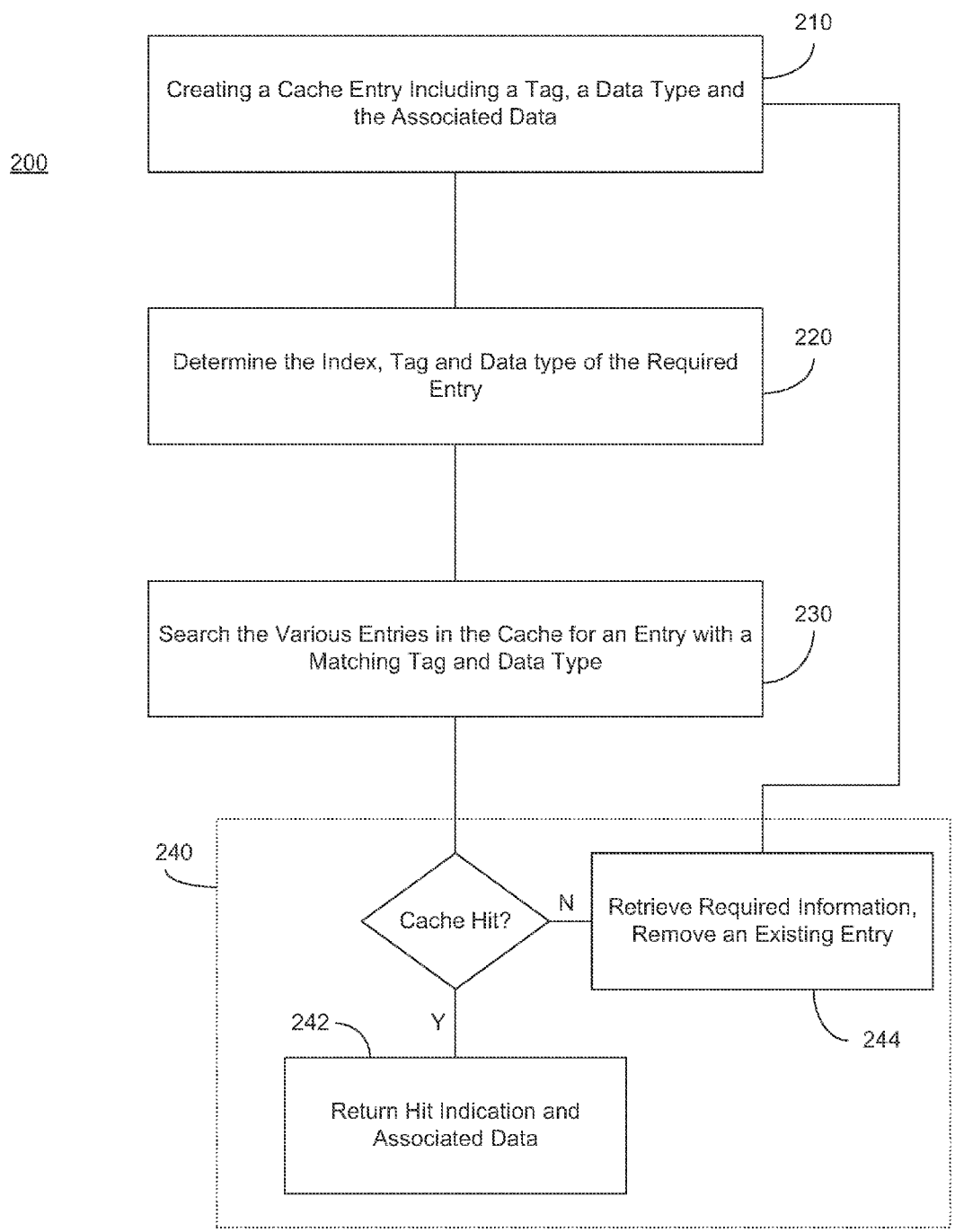
FIG. 2 illustrates a method for controlling a cache in a processor in accordance with an embodiment.

FIG. 2 illustrates a method 200 for controlling a cache 110 in accordance with one embodiment. The processor 100 first stores a tag 124, data type and/or identification in the cache 110 as described herein. (Step 210). The processor then determines the tag 124, data type 126 and/or identification of the corresponding entry to be located, and the index which specifies which location or locations at which the data may reside in the cache. (Step 220). The processor 100 then searches through the cache 110 at the indicated index for the determined tag 124, data type 126 and/or identification. (Step 230).

The processor 100 then performs an action based upon a need of the system. (Step 240). If an entry is found, the cache 110 may return a hit indication and the associated data. (Step 242). For example, the processor may be looking for a virtual to physical address translation, and thus looking for a TLB entry in the cache 110. Accordingly, if the cache returns a cache hit, indicating that the supplied virtual address and data type (TLB) has been found, the cache 110 returns data stored in a corresponding entry in the data array 130, which in this example would be a physical address.

In one embodiment, if an entry is not found, for example, the cache 110 may retrieve the required information, may remove an existing entry if the cache 110 is full and then return to Step 210 to create a new entry which corresponds to the original request. (Step 244). In another embodiment, for example, if the processor is searching for a TLB entry and the search results in a cache miss, the processor 100 may then search through the cache 110 for a related index 124 with a PDC tag. If the PDC search results in a cache hit, cache 110 returns the physical address of a page table (which is in memory) which includes the desired physical address. The physical address can then be stored in the cache 110 with a TLB tag in the tag array 120.

Figure 3:
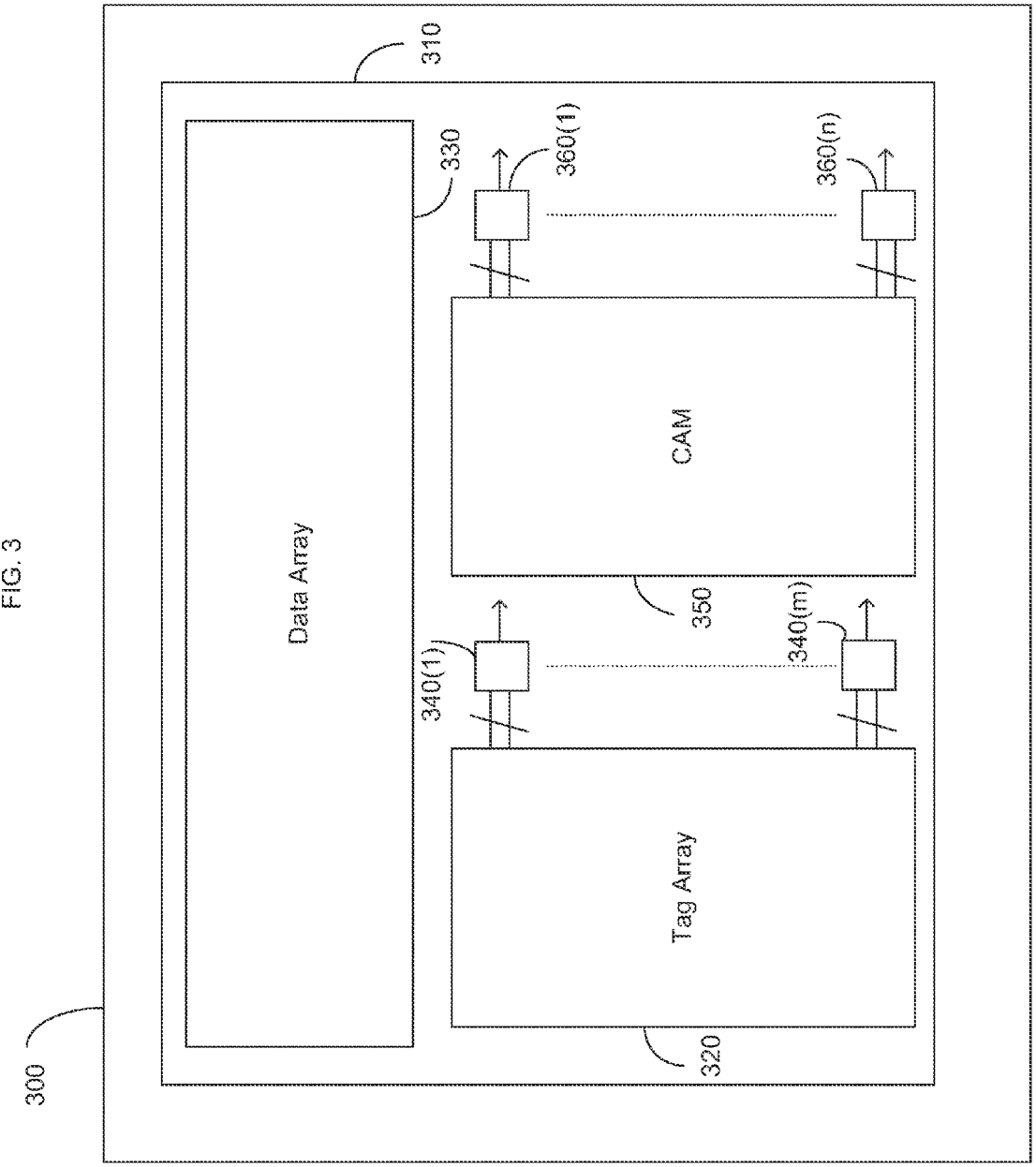
FIG. 3 illustrates another exemplary processor in accordance with an embodiment.

FIG. 3 illustrates another exemplary processor 300 in accordance with an embodiment. The processor has a cache 310, which includes a tag array 320 and a data array 330.

The tag array 320, which may be defined as having N number of entries corresponding to N number of entries in the data array 330, is connected to M number of comparators 340(1) to 340(m). Each comparator 340(1) to 340(m) is connected to N/M number of the entries in the tag array 320. The cache can have any number M comparators. For example, in one embodiment the number of comparators M can be equal to the number N (i.e., that the cache is fully associative). In another embodiment the number of comparators M can be equal to one (i.e., that the cache is a direct mapped cache.

In one exemplary embodiment the cache 310 may have eight comparators (i.e., m=8). In this embodiment, the cache 310 is eight-way associative. Each of the eight comparators is connected to n/8 number of entries in the tag array. When the processor is searching for a requested index, each comparator 340(1)-340(m) compares, in parallel, the index 124 from n/8 number entries of the tag array 320 to the requested index.

The cache 310 also includes a CAM 350. The CAM 350 stores corresponding identification bits for each entry in the data array 330. The CAM 350 includes n number of comparators 360(1)-360(n), each corresponding to one of the n entries in the data array 330. The identification bits may include data type bits (indicating the type of information currently stored in that entry, such as a TLB entry or a PDC entry), hardware address space identifier ("ASID") bits (which indicate which process or OS a given entry is associated with), guest/host bits (to indicate, in the case of TLB entries, whether the entry is a Guest TLB entry or a Host/Hypervisor entry), a global bit (to indicate whether the entry should be preserved across process switches), a partial entry bit (indicating that an entry is a partial entry, similar to a PDC entry, but corresponding to multiple steps of a page table walk), a splintered page bit (indicating that the entry is a mapping for a smaller page than the page table specified), a valid bit or any combination thereof.

Each of the identification bits stored in the CAM 350 may be received at the input of the corresponding comparator 360(1) to 360(n). The processor 300 can then, based upon the output of the comparators 360(1)-360(n) perform corresponding actions.

For example, if the processor is attempting to remove or delete all of the entries in the data array 330 which correspond to, for example, a Guest TLB entry for a fourth running operating system, the processor can use the comparators 360(1)-360(n) to identify all of the entries with matching identification bits. The processor can then remove or delete the entries by, for example, changing the corresponding valid bit for the entries.

The identification bits stored in the tag array 320 could also be used to store priority data which can be used by the processor to determine which entries should be replaced when new entries need to be stored. As discussed above, the processor 300 can use the output of comparators 360(1)-360(n) to identify entries in the data array 330 which can be replaced. In one embodiment, for example, a higher priority may be assigned to preserve global entries over non-global entries.

The term "exemplary" is used herein to represent one example, instance or illustration that may have any number of alternates. Any implementation described herein as "exemplary" should not necessarily be construed as preferred or advantageous over other implementations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiments in any way. Rather, the foregoing detailed description will provide those skilled in the art with a convenient road map for implementing an exemplary embodiment. It being understood that various changes may be made in the function and arrangement of elements described in an exemplary embodiment without departing from the scope of the invention as set forth in the appended claims.

What is claimed is:

1. A cache, comprising:
a data array having a plurality of entries configured to store a plurality of different types of address translation data;
a tag array having a plurality of entries, each entry of the tag array configured to store a data type, comprising an identification of a type of address translation data, for a corresponding entry of the plurality of entries in the data array, wherein each of the plurality of different types of address translation data corresponds to a different method of performing address translation; and
a plurality of comparators, each comparator configured to receive data stored in at least one entry in the tag array, wherein the cache is further configured to return a cache hit when one of the comparators matches a requested tag and data type to a tag and data type stored in an entry in the tag array.

2. The cache of claim 1, wherein the cache is configured to return a cache hit when a tag and a type of data stored in an entry in the tag array match a requested tag and type of data.

3. The cache of claim 1, wherein the different types of address translation data comprise one or more of system translation lookaside buffer data, page directory cache data and Guest translation lookaside buffer data.

4. The cache of claim 1, further comprising:
a first plurality of comparators, each of the first plurality of comparators configured to receive data stored in at least two entries in the tag array; and
a second plurality of comparators, each of the second plurality of comparators configured to receive identification bits corresponding to the at least two entries,
wherein the cache is further configured to remove entries in data array based upon the output of the first plurality of comparators and second plurality of comparators.

5. The cache of claim 4, wherein the cache is further configured to remove entries in the data array based upon a data type stored in the tag array or the content addressable memory.

6. A processor having a cache, comprising:
a data array, having a plurality of entries, configured to store a plurality of different types of address translation data;
a tag array, having a plurality of entries, configured to store a tag of the address translation data stored at a corresponding entry in the data array and further configured to store an identification of the type of address translation data stored in the corresponding entry in the data array, wherein each of the plurality of different types of address translation data corresponds to a different method of performing address translation;
a first plurality of comparators, each comparator configured to receive data stored in at least one entry in the tag array, wherein the processor is further configured to return a cache hit when one of the first plurality of comparators matches a requested tag and data type to an tag and data type stored in an entry in the tag array;
a content addressable memory having a plurality of entries configured to store identification bits corresponding to each entry in the data array; and
a second plurality of comparators, each of the second plurality of comparators configured to receive data stored from an entry in the content addressable memory.

7. The processor of claim 6, wherein the processor is configured to return a cache hit when a tag and a type of data stored in an entry in the tag array match a requested tag and type of data.

8. The processor of claim 6, wherein the different types of address translation data comprise one or more of system translation lookaside buffer data, page directory cache data and Guest translation lookaside buffer data.

9. The processor of claim 6, wherein the processor is further configured to remove entries in data array based upon the output of the first plurality of comparators and second plurality of comparators.

10. The processor of claim 6, wherein the processor is further configured to remove entries in the data array based upon a data type stored in the tag array or identification bits stored in the content addressable memory.

11. A method, comprising:
storing a plurality of different types of address translation data in a data array of a cache, wherein each of the plurality of different types of address translation data corresponds to a different method of performing address translation;
searching for a determined tag and a determined data type in a tag array of the cache by comparing, using a plurality of comparators, data in the tag array to the determined tag and data type, wherein the determined data type comprises a determined type of address translation data; and
returning, by the cache to a processor, a cache hit if an entry in the tag array matches both the determined index and the determined data type.

12. The method of claim 11, further comprising:
storing, by the processor, an entry in the data array of the cache; and
storing, by the processor, a tag and a data type corresponding to the entry stored in the data array of the cache.

13. The method of claim 11, further comprising:

returning, by the cache to the processor, the data stored in a corresponding entry in the data array when the cache hit occurs.

14. The method of claim 11, wherein there are fewer comparators than entries in the data array.

\* \* \* \* \*